United States Patent
Gupta

(10) Patent No.: US 6,653,360 B2
(45) Date of Patent: Nov. 25, 2003

(54) FLEXIBLE FOAMED POLYETHYLENE

(76) Inventor: Chakra V. Gupta, 3155 Auld Farm Dr., Lenoir, NC (US) 28645

(*) Notice: Subject to any disclaimer, the term of this patent is extended or adjusted under 35 U.S.C. 154(b) by 0 days.

(21) Appl. No.: 10/152,910

(22) Filed: May 22, 2002

(65) Prior Publication Data

US 2003/0060525 A1 Mar. 27, 2003

Related U.S. Application Data

(60) Provisional application No. 60/293,265, filed on May 23, 2001.

(51) Int. Cl.$^7$ ................................. C08J 9/08; C08J 9/10
(52) U.S. Cl. .......................... 521/139; 521/81; 521/98; 521/140
(58) Field of Search .......................... 521/81, 139, 140, 521/98

(56) References Cited

U.S. PATENT DOCUMENTS

| | | | |
|---|---|---|---|
| 5,070,111 A | 12/1991 | Dumbauld |
| 5,585,411 A | 12/1996 | Hwo |
| 5,824,400 A | 10/1998 | Petrakis et al. |
| 5,855,287 A | 1/1999 | Burns |
| 5,939,464 A | 8/1999 | Wang |
| 6,153,275 A | 11/2000 | Yaniger |
| 6,187,837 B1 | 2/2001 | Pearce |

*Primary Examiner*—Morton Foelak

(74) *Attorney, Agent, or Firm*—Alston & Bird LLP

(57) ABSTRACT

A flexible thermoplastic article is formed from a blend comprising from about 2 to about 15 weight percent of a styrene-elastomer block copolymer; from about 60 to about 90 weight percent polyolefin; from about 4 to about 15 weight percent plasticizer oil, and optionally from about 0 to about 3 weight percent of at least one additive. The additives are typically present in a concentration of from 0.05 to about 3 weigh percent and can include those additives conventionally used in polyolefin foam compositions, including antioxidants and stabilizers, processing aids, etc. The styrene-elastomer block copolymer is preferably a tri-block copolymer structure which includes styrene end-blocks and a mid-block of a saturated olefin elastomer. A particularly suitable styrene elastomer block copolymer is a styrene-ethylene/butylene-styrene (SEBS) block copolymer. In one embodiment of the present invention, the styrene-ethylene/butylene-styrene block copolymer has a styrene/rubber ratio of from 30 to 70 with an Average Molecular Weight ($M_n$) in the range of 50,000 to 300,000. The polyolefin is preferably predominately a polyethylene and desirably comprises from 85 to 100 weight percent polyethylene and from 0 to 15 weight percent polypropylene, more preferably from 95 to 100 weight percent polyethylene and from 0 to 5 weight percent polypropylene. Particularly suitable for inclusion in the foam composition of the present invention are those polyolefins which are produced with a single-site catalyst and are generally referred to in the industry as metallocene polyethylene. The polyolefin component can also include a blend of linear low density polyethylene and high density polyethylene. The plasticizer oil preferably has a molecular weight of from 200 to 1,000, and most desirably around 400.

20 Claims, No Drawings

FLEXIBLE FOAMED POLYETHYLENE

CROSS-REFERENCE TO RELATED APPLICATION

This application claims priority from U.S. Provisional Patent Application No. 60/293,265 filed May 23, 2001, the content of which is incorporated herein by reference.

FIELD OF THE INVENTION

This invention relates to a thermoplastic foam, and more particularly to a flexible foamed thermoplastic article formed from a foamed polyolefin.

BACKGROUND OF THE INVENTION

Polyolefin foam products are used in numerous fields, including thermal and electrical insulation, cushioning and packaging. For example, pipe insulation has been produced by extruding foamed polyethylene in a hollow tubular configuration, cutting the tubular material to lengths, and longitudinally slitting the tube to allow for placing the tube around a pipe. Foamed polyethylene is also used as an electrical insulation or dielectric in various cable constructions, such as coaxial cables, for example. Polyethylene foam is also commonly used as a protective cushion in packaging, or as a cushion material in furniture.

Polyethylene foam has highly desirable attributes including low cost, chemical inertness, and clean electrical performance. However, the relative stiffness of the polymer makes it unsuited for certain applications where flexibility, resilience, bending performance, or resistance to high temperatures are important. Although the high temperature resistance can be improved by cross-linking, the resulting cross-linked foam is not recyclable and the peroxide initiators used for cross-linking are not environmentally friendly.

SUMMARY OF THE INVENTION

Accordingly, it is an object of the present invention to provide a foam having improved physical properties. A more particular object of the present invention is to provide a foamed article which is thermoplastic and which has excellent flexibility, resilience, and temperature resistance.

The flexible thermoplastic article of the present invention is formed from a blend comprising from about 2 to about 15 weight percent of a styrene-elastomer block copolymer; from about 60 to about 90 weight percent polyolefin; from about 4 to about 15 weight percent plasticizer oil, and optionally from about 0 to about 3 weight percent of at least one additive. The additives are typically present in a concentration of from 0.05 to about 3 weigh percent and can include those additives conventionally used in polyolefin foam compositions, including antioxidants and stabilizers, processing aids, etc. The styrene-elastomer block copolymer is preferably a tri-block copolymer structure which includes styrene end-blocks and a mid-block of a saturated olefin elastomer. A particularly suitable styrene elastomer block copolymer is a styrene-ethylene/butylene-styrene (SEBS) block copolymer. In one embodiment of the present invention, the styrene-ethylene/butylene-styrene block copolymer has a styrene/rubber ratio of from 30 to 70 with an Average Molecular Weight ($M_n$) in the range of 50,000 to 300,000. The polyolefin is preferably predominately a polyethylene and desirably comprises from 85 to 100 weight percent polyethylene and from 0 to 15 weight percent polypropylene, more preferably from 95 to 100 weight percent polyethylene and from 0 to 5 weight percent polypropylene. Particularly suitable for inclusion in the foam composition of the present invention are those polyolefins which are produced with a single-site catalyst and are generally referred to in the industry as metallocene polyethylene. The polyolefin component can also include a blend of linear low density polyethylene and high density polyethylene. The plasticizer oil preferably has a molecular weight of from 200 to 1,000, and most desirably around 400.

In accordance with one aspect of the present invention, the foam article may be in the form of a hollow tubular pipe insulation. In another aspect, the foam article can serve as the dielectric in a coaxial cable.

In a further aspect of the present invention, there is provided a composition for producing a flexible thermoplastic foam. The composition consists essentially of a) from about 2 to about 15 percent by weight styrene-elastomer block copolymer; b) from about 60 to about 90 percent by weight polyolefin; c) from about 4 to about 15 percent by weight plasticizer oil;d) at least one blowing agent in an amount sufficient to produce a foam structure; and e) from about 0 to about 3 percent by weight of at least one additive. The blowing agent may be selected from the group consisting of fluorinated aliphatic hydrocarbons, aliphatic hydrocarbons, or chemical blowing agents. When the blowing agent is a chemical blowing agent, it may comprise at least one member selected from the group consisting of azodicarbonamide, sodium bicarbonate, sodium carbonate, ammonium carbonate, and citric acid.

DETAILED DESCRIPTION OF THE INVENTION

Flexible thermoplastic articles in accordance with the present invention are produced with conventional extrusion and foaming equipment. The ingredients are blended together thoroughly, typically in the barrel of an extruder, mixed with a chemical or physical blowing agent or combinations thereof, and extruded from a die of a suitable shape and configuration for the article which is being manufactured. Alternatively, the flexible foamed article can be produced by other processes, such as injection molding.

The styrene-elastomer block copolymer is preferably a tri-block copolymer structure which includes styrene end-blocks and a mid-block of a saturated olefin elastomer. Typically, in these tri-block copolymer structures, the saturated olefin elastomer mid-block may comprise butadiene, isoprene, ethylene-butylene, or ethylene-propylene. Particularly preferred for the present invention is a styrene-ethylene/butylene-styrene (SEBS) block polymer, and most desirably a SEBS block copolymer which is predominately a linear tri-block copolymer structure. The preferred SEBS block copolymer has a styrene to rubber (elastomer) ratio of from 30 to 70 with an Average Molecular Weight ($M_n$) in the range of 50,000 to 300,000, most desirably about 200,000.

Linear tri-block SEBS copolymers of this type are manufactured and sold by Kraton Polymers as the KRATON G series of thermoplastic rubber and by Kuraray America, Inc. as the SEPTON® series of thermoplastic rubbers. Preferably, the block copolymer has a styrene content of from 25 to 40 weight percent, and most desirably from about 30 to 35 weight percent; a specific gravity of 0.89 to 0.93 percent, most desirably about 0.90 to 0.92 percent. The preferred SEBS block copolymer does not melt, and therefore cannot be characterized by its melt viscosity or melt index. However, when blended with polyolefin and plasticizer oil, the block copolymer is melt processable.

The polyolefins which are useful in the present invention are homo or copolymers of olefins such as polyethylene, polypropylene, polybutylene, etc. and blends thereof. The polyolefin used herein is preferably predominately a polyethylene homopolymer or copolymer, preferably a low density polyethylene homopolymer and preferably comprises from 85 to 100 percent by weight of the polyethylene, which may be blended with up to 15 weight percent of other polyolefins, such as polypropylene, most preferably from 0 to 5 weight percent polypropylene. A particularly preferred polyethylene is a metallocene polyethylene. Suitable commercially available polyethylene resins include the Affinity series of resins from Dow Chemical Company.

The polyethylene may be blended with small amounts of other polyolefins, such as polypropylene up to about 15 percent by weight of the total polyolefin composition. The addition of a small amount of a polypropylene can be used to alter the melt flow rate of the final composition. The addition of polypropylene also improves the thermal and weather resistance of the foam composition. Preferably, the blend has a melt flow rate (measured at 190° C. with a 2.56 kg weight) of from about 5 to 35, more preferably from about 5 to 12.

The plasticizer oil may suitably be a mineral oil or other paraffinic hydrocarbon oil, preferably one having a molecular weight from about 200 to 1,000.

The foamable composition may also contain additives of the type and at the concentration conventionally used in the manufacture of polyolefin foams. Preferably, these additives are present in the composition at a concentration of about 0.05 to about 3 percent by weight of the total composition. Examples of suitable additives include fillers, pigments, antioxidants, UV stabilizers, thermal stabilizers, flame retardants, slip agents, mold release agents, antiblocking agents, nucleating agents, smoke suppressants, and surfactants.

The additives and other components are blended thoroughly together and a blowing agent is incorporated into the blend in order to generate the desired foamed cellular structure. The blowing agent can be a physical blowing agent, a chemical blowing agent, or combinations of physical and chemical blowing agents. Physical blowing agents can include aliphatic hydrocarbons such as propane, isobutane, pentane and hexane, fluorinated hydrocarbons, nitrogen or other gasses. Chemical blowing agents can include endothermnic or exothermic chemical compounds which decompose at elevated temperature to form gasses, or combinations of endothermic and exothermic chemical blowing agents. Examples of chemical blowing agents include azodicarbonamides, sodium bicarbonate, sodium carbonate, amimonium carbonate, and mixtures thereof. The components are blended and heated in the barrel of an extruder, and when released to atmospheric conditions, generate a foam with a fine uniform cell structure and a high percentage of closed cells.

Blending of the components is preferably carried out by melt compounding in an extruder, preferably a twin screw extruder. In one preferred embodiment, a masterbatch composition is prepared by melt compounding the ingredients in a twin screw extruder and forming pellets of the masterbatch composition. This masterbatch composition can then be blended with polyethylene resin in flake form by dry tumbling or by mixing in an extruder. Additional plasticizer oil can be incorporated into the composition by injecting directly into the extruder barrel.

The foam articles produced in accordance with the present invention have excellent bending performnance. By "bending performance" it is meant that samples of the foam articles can withstand severe bending without cell rupture or other permnanent damage to the foam structure. For example, a sample of ¾ inch wall thickness may withstand a 2 inch bend radius without damage. This test may be performed by bending the sample around a mandrel having a 2 inch radius and then inspecting the sample for cell rupture or damage. The foam also has excellent resistance to high temperatures. A further advantage is that the foam articles have very low shrink-back, and thus the foam can be used or further fabricated immediately following extrusion without requiring aging, as is necessary with polyethylene foams. This, together with its excellent thermal insulation properties and resistance to elevated temperatures, makes the foam particularly useful as thermal insulation, such as pipe insulation. When the foam is used for fabrication into pipe insulation, the foam may be extruded in tubular foam, and then without requiring an aging step, it can be longitudinally slit, and provided with a seal or adhesive strip. Such operations could be performed in-line with the foam extrusion process. For pipe insulation applications, the foam is capable of withstand exposure to temperatures of at least 110° C. for prolonged periods of time without rupture or collapse of the foam cells.

A suitable test procedure for assessing the high temperature resistance of the foam composition is as follows. The test apparatus consists of a closed loop of copper tubing connected to a oil pump. The oil pump is connected to an oil reservoir, a heater and a cooling element. The copper tubing loop consists of four straight runs of 2.5 ft each connected through 90 degrees elbows and a 6 inch U-turn. The oil is heated up to a predetermined temperature and circulated through the copper tubing. The inlet and outlet temperatures of the oil are recorded. The test specimen (plastic foam) with an inside diameter corresponding to the outside diameter of the tubes is placed over the copper tubes. The copper tubes are then heated to a desired temperature by circulating oil. After 96 hours, the heat source is turned off, and the assembly is cooled to about room temperature before foams are removed. The test specimens are then examined for cracking, delamination, or any other changes that can be visually observed.

The foam composition is also useful as a foam dielectric in cable construction. Its dielectric properties provide a low signal loss at frequencies in the range of 2 to 20 GHz.

The following non-limiting examples further illustrate the invention.

EXAMPLE 1

Formulations 1 to 5 of Table 1 below were prepared by melt compounding the components in a twin screw extruder operating at a temperature ranging from 180 to 250° C. The blend was extruded in the form of continuous strands, and chopped into pellet form. Of the components listed in Table 1, Septon 4055, Septon 8006 and Kraton G-1654 are commercially available styrene-elastomer block copolymers, more particularly, linear tri-block styrene-ethylene/butylene-styrene (SEBS) copolymers. Hydrobrite 380PO and Carnation mineral oil are white mineral oils from Witco Corp., Performance Chemicals Group. Profax SM 6100 is a general purpose polypropylene homopolymer (Melt index 11) available from Montell NA, Inc. Irganox 1010 and Ultranox 626 are antioxidant/stabilizers for polyolefins which are available from Ciba and from General Electric, respectively. Affinity 1140 is an ethylene alpha-olefin resin available from Dow Chemical Company. The product names are trademarks of the respective suppliers.

TABLE 1

| COMPONENT | PARTS BY WEIGHT | | | | |
|---|---|---|---|---|---|
| Formulation | 1 | 2 | 3 | 4 | 5 |
| Septon 4055 | | | 16.54 | | |
| Septon 8006 | 43.90 | 10.98 | | | |
| Kraton G-1654 | | 22.46 | | 30.00 | 33.30 |
| Hydrobrite 380PO | 43.90 | 40.92 | | 40.00 | 41.50 |
| Carnation mineral oil | | | 82.66 | | |
| Profax SM 6100 | 12.00 | 3.00 | | | |
| Irganox 1010 | 0.10 | 0.10 | 0.15 | 0.10 | 0.10 |
| Ultranox 626 | 0.10 | 0.10 | 0.15 | 0.10 | 0.10 |
| Calcium Stearate | | | 0.50 | | |
| Affinity 1140 PE | | 22.46 | | 30.00 | 25.00 |

EXAMPLE 2

The masterbatch pellets of formulations 1–5 were blended with low density polyethylene (LDPE) flake or with a blend of LDPE and high density polyethylene (HDPE) flake in the proportions shown in Table 2 below, together with a chemical blowing agent and additives in the proportions indicated. This composition was thoroughly blended at elevated temperature in an extruder barrel, cooled and then directed through an extruder die into atmosphere.

TABLE 2

| COMPONENT | PARTS BY WEIGHT | | | | |
|---|---|---|---|---|---|
| Foam Composition | 6 | 7 | 8 | 9 | 10 |
| Formulation 1 | 15 | 20 | 25 | | |
| Formulation 2 | | | | 15 | 20 |
| Formulation 3 | | | | | |
| Formulation 4 | | | | | |
| Formulation 5 | | | | | |
| LDPE | 76.5 | 68 | 67.5 | 85 | 68 |
| HDPE | 8.5 | 12 | 7.5 | | 12 |
| Azodicarbonamide | 0.2 | 0.5 | 0.5 | 0.2 | |
| Citric Acid/Sodium Bicarbonate | | | | | 0.5 |
| Talc | 0.1 | 0.1 | 0.25 | | |

The foam composition 9 from Table 2 was tested for electrical and physical properties. The results are given in Table 3.

TABLE 3

| Property | ASTM No. | Test Data |
|---|---|---|
| Density (gm/cm$^3$) | D792 | 0.953 |
| Tensile Strength, PSI | D638 | 4000 |
| Elongation @break, % | D638 | >600 |
| Dielectric Constant, 1 MHz | D1531 | 2.3 |
| Dissipation Factor @ 1 MHz, | D1531 | 60 micro radians |
| Dissipation factor @ 2 GHz | D1531 | <33 micro radians |
| Volume resistivity | D1531 | 1 × 10e16 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A flexible thermoplastic article having a foamed structure and comprising:
   a) from about 2 to about 15 percent by weight styrene-elastomer block copolymer;
   b) from about 60 to about 90 percent by weight polyolefin;
   c) from about 4 to about 15 percent by weight plasticizer oil; and
   d) from about 0 to about 3 percent by weight of at least one additive.

2. The article of claim 1, wherein said styrene-elastomer block copolymer is a tri-block copolymer structure that includes styrene end-blocks and a mid-block of a saturated olefin elastomer.

3. The article of claim 1, wherein said styrene-elastomer block copolymer is a styrene-ethylene/butylene-styrene (SEBS) block copolymer.

4. The article of claim 3, wherein said styrene-ethylene/butylene-styrene (SEBS) block copolymer is predominately a linear tri-block copolymer structure.

5. The article of claim 3, wherein said styrene-ethylene/butylene-styrene block copolymer has a styrene/rubber ratio of from 30 to 70 with an Average Molecular Weight ($M_n$) in the range of 50,000 to 300,000.

6. The article of claim 1, wherein said polyolefin comprises from 85 to 100 weight percent polyethylene and from 0 to 15 weight percent polypropylene.

7. The article of claim 1, wherein said polyolefin comprises metallocene polyethylene.

8. The article of claim 1, wherein said polyolefin comprises a blend of linear low density polyethylene and high density polyethylene.

9. The article of claim 1, wherein said plasticizer oil comprises a hydrocarbon oil having a molecular weight of from 200 to 1000.

10. The article of claim 1, which has a uniform closed cell structure, and wherein the article will withstand elevated temperatures of 110° C. for 96 hours without rupture or collapse of the foam cells.

11. The article of claim 1, having an electrical dissipation factor at 2 Ghz in the range of 30 to 200 microradians.

12. A flexible thermoplastic foam having a closed cell foam structure and comprising:
   a) from about 2 to about 15 percent by weight styrene-ethylene/butylene-styrene (SEBS) block copolymer;
   b) from about 60 to about 90 percent by weight low density polyethylene;
   c) from about 4 to about 15 percent by weight plasticizer oil; and
   d) from about 0 to about 3 percent by weight of at least one additive.

13. Hollow tubular pipe insulation made from the foam of claim 1.

14. A coaxial cable comprising a dielectric formed of the thermoplastic foam of claim 1.

15. A composition for producing a flexible thermoplastic foam, said composition consisting essentially of:
   a) from about 2 to about 15 percent by weight styrene-elastomer block copolymer;
   b) from about 60 to about 90 percent by weight polyolefin;
   c) from about 4 to about 15 percent by weight plasticizer oil;
   d) at least one blowing agent in an amount sufficient to produce a foam structure; and e) from about 0 to about 3 percent by weight of at least one additive.

16. The composition of claim 15, wherein said styrene-elastomer block copolymer is a styrene-ethylene/butylene-styrene (SEBS) block copolymer.

17. The composition of claim 16, wherein said styrene-ethylene/butylene-styrene (SEBS) block copolymer is predominately a linear tri-block copolymer structure.

18. The composition of claim 17, wherein said styrene-ethylene/butylene-styrene block copolymer has a styrene to rubber ratio of from about 25 to about 75.

19. The composition of claim 15, wherein said blowing agent is selected from the group consisting of fluorinated aliphatic hydrocarbons, aliphatic hydrocarbons, or chemical blowing agents.

20. The composition of claim 15, wherein said blowing agent is a chemical blowing agent comprising at least one member selected from the group consisting of azodicarbonamide, sodium bicarbonate, sodium carbonate, ammonium carbonate, and citric acid.

* * * * *